Jan. 4, 1944.   E. G. KASTENSCHMIDT   2,338,334
HITCH DEVICE
Filed June 12, 1942   2 Sheets-Sheet 1

Inventor
Elmer G. Kastenschmidt,
By McMorrow & Berman
Attorneys

Jan. 4, 1944.                E. G. KASTENSCHMIDT                2,338,334
                                 HITCH DEVICE
                            Filed June 12, 1942           2 Sheets-Sheet 2
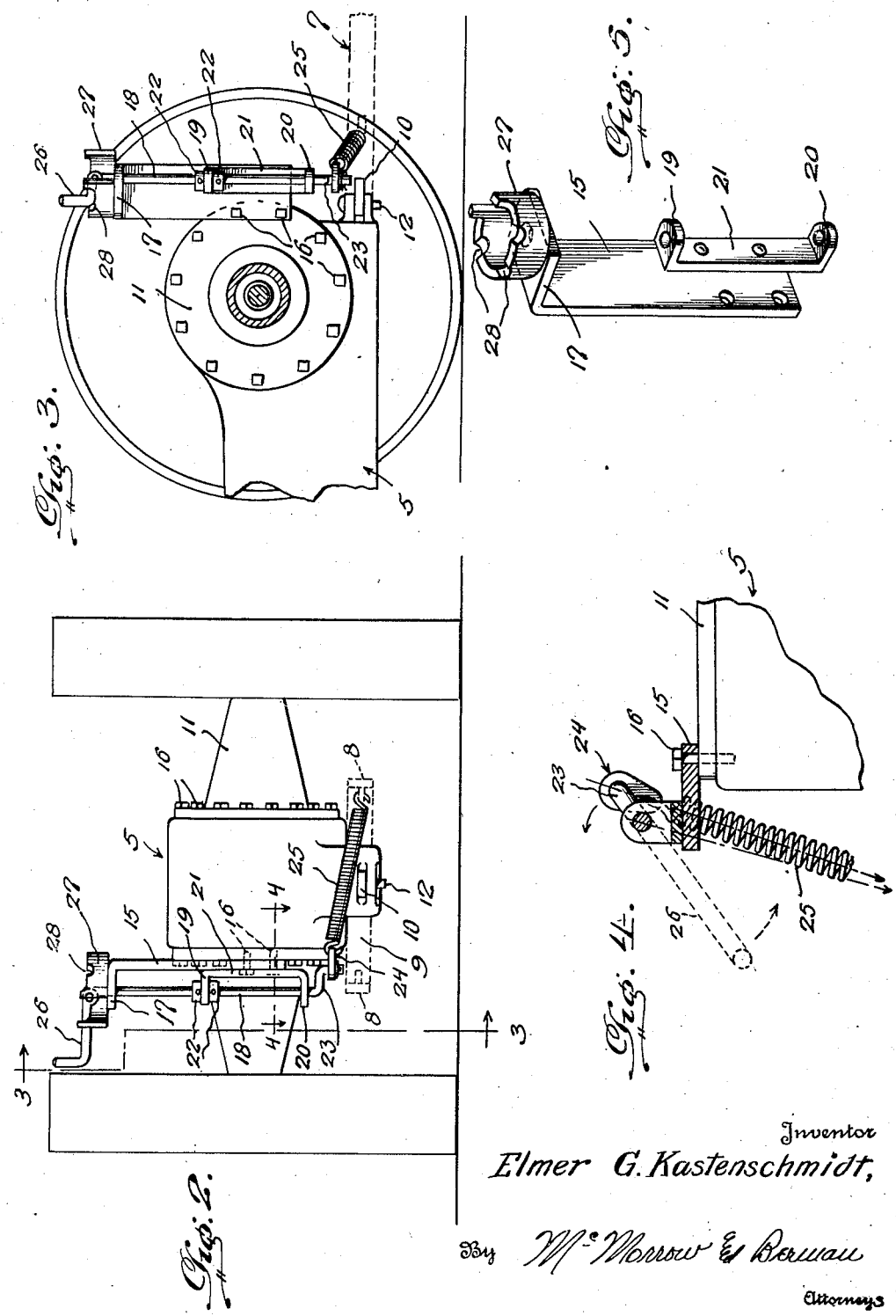
Inventor
Elmer G. Kastenschmidt, Patented Jan. 4, 1944

2,338,334

UNITED STATES PATENT OFFICE 2,338,334

HITCH DEVICE

Elmer G. Kastenschmidt, Mindoro, Wis.

Application June 12, 1942, Serial No. 446,803

3 Claims. (Cl. 97—47)

This invention relates to a hitch device employed for coupling a farm implement, such as a plow, to a tractor, and more particularly to a hitch adjusting medium, and has for the primary object the provision of an attachment which may be easily and quickly installed on a tractor and connected to the hitch of the implement pulled by said tractor, so that when said implement and tractor are operating on a hillside, the hitch may be made to cause the implement to shift uphill when said implement tends to slip downhill and thus counteract the tendency of the implement to side slip relative to the tractor and should said implement be a gang plow, the operator of the tractor on reaching the hillside and through the adjustment of said attachment, may prevent the plow elements from side slipping downhill and thereby assure each plow element developing a full furrow.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary top plan view showing a portion of a tractor and a farm implement hitched thereto with the tractor equipped with the present invention and the latter connected to the hitch.

Figure 2 is a transverse sectional view illustrating the mounting of the attachment on the rear axle housing of the tractor and its connection to the hitch.

Figure 3 is a sectional view taken on the line 3—3 of Figure 2.

Figure 4 is a sectional view taken on the line 4—4 of Figure 2.

Figure 5 is a perspective view illustrating an attaching bracket forming a part of the attachment.

Figures 1, 6:
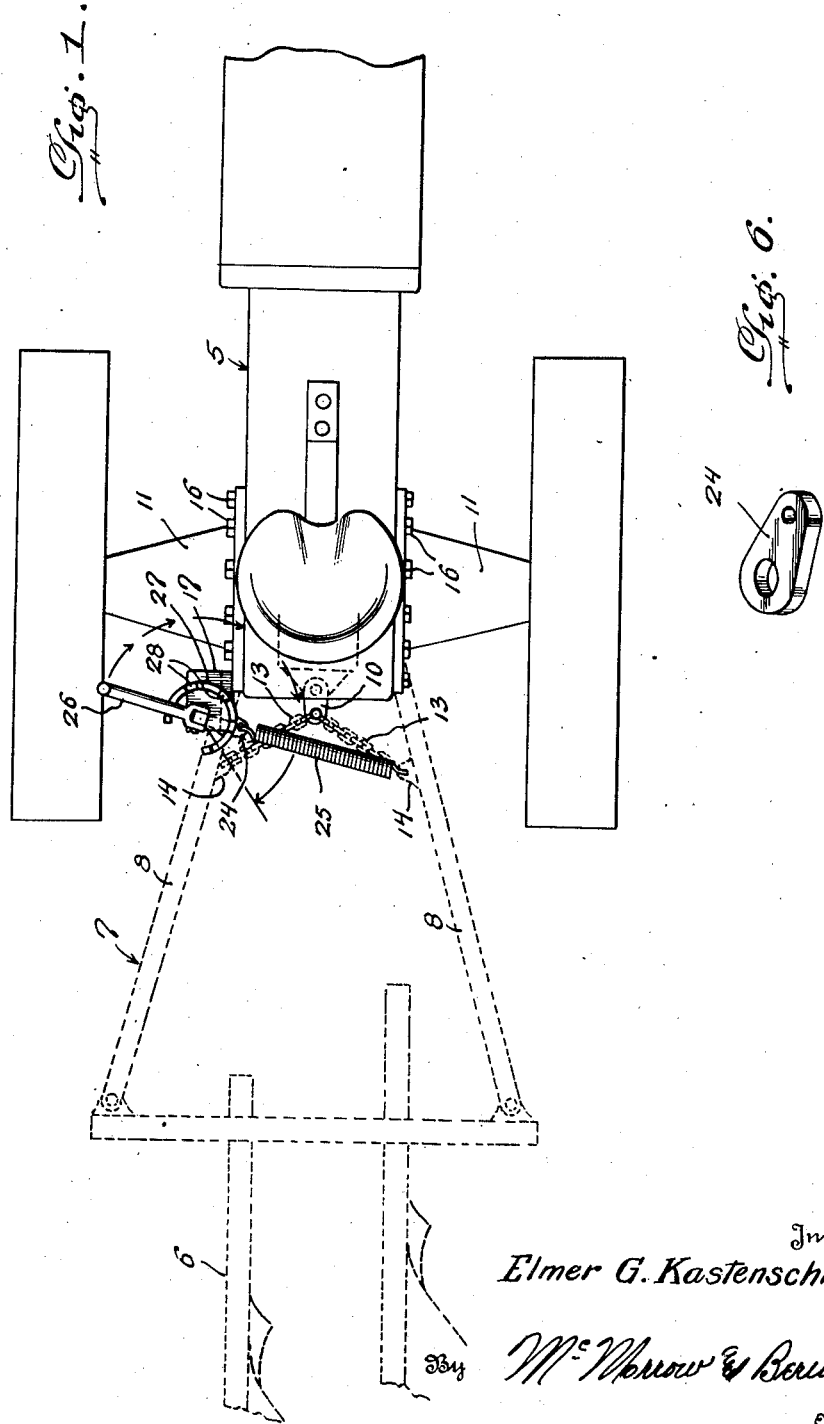
Figure 6 is a perspective view illustrating a spring connecting plate forming a part of the present invention.

Referring in detail to the drawings, the numeral 5 indicates a fragmentary portion of a tractor, 6 a farm implement connected to said tractor by a hitch 7. In this instance the farm implement is a gang type plow to which the side members 8 of the hitch 7 are pivotally connected. The side members converge in the direction of the tractor and are connected at their forward ends by a cross member 9 underlying a pivoted type clevis 10 and the rear axle housing 11 of the tractor 5. The clevis 10 is connected to the housing 11 by a removable pivot pin 12 and connected to the clevis 10 are diverging chains or flexible elements 13 connected to ears 14 carried by the side members 8 of the hitch 7.

Thus it will be seen that the farm implement 6 is capable of pivotal movement in relation to the tractor. This movement is desirable when making short turns and as long as the tractor is operating on level ground will have no effect on the proper operation of the farm implement. However, when the implement and tractor are operating on a hillside, the pivotal connection of the hitch will permit the implement to side slip relative to the tractor in a direction downwardly of the hill. Said side slip of the implement, when the latter is of a gang plow type, will bring about improper plowing of the ground or prevent each plow element from completing a full furrow.

To overcome this disadvantage of the pivotal hitch under said stated operating condition, the present inventition is placed in operation and is in the form of an attachment easily installed on the tractor 5 and connected to the hitch 7, a clear illustration thereof being made by Figures 1, 2 and 3 of the drawings.

The attachment includes an attaching plate 15 provided with openings to receive certain of stud bolts 16 forming a part of the rear axle housing 11 of the tractor. The attaching plate 15 when bolted on the axle housing is arranged vertically and to one side of the longitudinal axis of the tractor and has its upper end bent at right angles and apertured to form a journal 17 for an operating shaft 18 which is also journaled in bearings 19 and 20 of a bearing plate 21 secured on the attaching plate 15 and paralleling the latter.

Stop collars 22 are secured on the operating shaft by set screws and are arranged above and below the bearing 19 for limiting vertical movement of the operating shaft. The lower end of the operating shaft is bent to form a crank 23 on which is journaled a plate 24 apertured to receive one end of a coil spring 25, the other end of the coil spring being hooked into one of the ears 14 of the hitch 7 and upon an opposite side of the longitudinal axis of the tractor from the location of the operating shaft 18.

An operating handle 26 in the form of a crank is pivoted to the upper end of the operating shaft and is supported horizontally by a quadrant 27 carried by the bearing 17 of the attaching plate. The quadrant is provided with a series of notches 28 any one of which may receive the operating handle 26 to releasably secure the latter in different positions. The operating handle when in one position and in engagement with a notch of the quadrant may relieve the spring 25 of all tension so that the hitch 7 may operate normally with full pivotal movement. However, by moving the operating handle into the other notches, the tension on the spring 25 may be varied creating a side pull upon the hitch 7. The action of the spring on the hitch 7 as specified is desired when the implement 6 and tractor 5 are operating on a hillside to prevent the implement from slipping sideways or laterally of the tractor in a direction of downhill. The operator on approaching the hillside tensions the spring 25 as desired so that said spring will act on the hitch to tend to shift the implement 6 upwardly of the hill and thereby prevent the side slip of the implement downwardly of the hill and permit the implement to track or follow in straight line with the tractor and also permit the plow elements of the farm implement to each develop a full furrow in the ground.

Of course, it is to be understood that as soon as the tractor and implement 6 pass from the hillside, the operator through the manipulation of the operating handle 26 may release the action of the spring on the hitch to permit the latter to function with full and free pivotal movement while the tractor and implement 6 are traveling on substantially level ground.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination with a tractor and a plow coupled thereto by a hitch pivoted to said tractor, an operating shaft journaled on the tractor to one side of the longitudinal axis thereof and including a crank, a spring connected to said crank and to the hitch to one side of the longitudinal axis of the tractor, and means whereby said shaft may be rotated to increase the tension of the spring to apply a force on the hitch and in a direction at substantially right angles to the longitudinal axis of said tractor tending to shift the plow sideways in a direction opposite to its normal tendency to side slip in an opposite direction on a hillside.

2. In an attachment for a hitch, an attaching plate mounted vertically on a tractor to one side of the longitudinal axis of said tractor, an operating shaft rotatably supported by said attaching plate, a crank formed on said shaft, a coil spring having one end connected to the crank and its opposite end connected to a hitch of the tractor and at one side of the longitudinal axis of the tractor, and means whereby said shaft may be rotated to slacken and tension said spring whereby the latter when tensioned will apply force to the hitch in a direction at right angles to the longitudinal axis of the tractor tending to shift a plow of the hitch sideways in a direction opposite to its normal tendency to side slip in an opposite direction on a hillside.

3. In an attachment for a hitch, an attaching plate mounted vertically on a tractor to one side of the longitudinal axis of said tractor, an operating shaft rotatably supported by said attaching plate, a crank formed on said shaft, a coil spring having one end connected to the crank and its opposite end connected to a hitch of the tractor and at one side of the longitudinal axis of the tractor, a quadrant provided with notches carried by the attaching plate, and an operating handle movable over said quadrant and notches and pivoted to the operating shaft for rotating the latter to tension and slacken said spring whereby the latter on being tensioned applies a force on a hitch pivoted to the tractor tending to shift a plow of the hitch sideways in a direction opposite to its normal tendency to side slip on a hillside.

ELMER G. KASTENSCHMIDT.